(12) United States Patent
Takagi et al.

(10) Patent No.: US 11,466,137 B2
(45) Date of Patent: *Oct. 11, 2022

(54) FOAM PARTICLES, AND MOULDED ARTICLE THEREOF

(71) Applicant: JSP Corporation, Tokyo (JP)

(72) Inventors: Shota Takagi, Yokkaichi (JP); Masaharu Oikawa, Tokyo (JP)

(73) Assignee: JSP Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/348,108

(22) PCT Filed: Nov. 7, 2017

(86) PCT No.: PCT/JP2017/040078
§ 371 (c)(1),
(2) Date: May 7, 2019

(87) PCT Pub. No.: WO2018/088390
PCT Pub. Date: May 17, 2018

(65) Prior Publication Data
US 2019/0256680 A1 Aug. 22, 2019

(30) Foreign Application Priority Data
Nov. 11, 2016 (JP) .............................. JP2016-220598

(51) Int. Cl.
| | |
|---|---|
| *C08J 9/228* | (2006.01) |
| *C08J 9/18* | (2006.01) |
| *C08K 3/04* | (2006.01) |
| *C08K 5/3417* | (2006.01) |
| *C08J 9/16* | (2006.01) |

(52) U.S. Cl.
CPC .................. *C08J 9/228* (2013.01); *C08J 9/16* (2013.01); *C08J 9/18* (2013.01); *C08K 3/04* (2013.01); *C08K 5/3417* (2013.01); *C08J 2203/22* (2013.01); *C08J 2355/00* (2013.01)

(58) Field of Classification Search
CPC ...................................................... C08J 9/228
See application file for complete search history.

(56) References Cited

U.S. PATENT DOCUMENTS

| | | | | |
|---|---|---|---|---|
| 4,366,263 A | * | 12/1982 | Sato ...................... | B29C 67/205 |
| | | | | 264/53 |
| 4,379,859 A | | 4/1983 | Hirosawa et al. | |
| 4,464,484 A | | 8/1984 | Yoshimura et al. | |
| 5,071,883 A | | 12/1991 | Kuwabara et al. | |
| 9,449,735 B2 | | 9/2016 | Chiba et al. | |
| 10,435,530 B2 | * | 10/2019 | Takagi ................ | C08F 297/086 |
| 10,787,555 B2 | * | 9/2020 | Takagi .................... | C08J 9/232 |
| 2002/0143077 A1 | | 10/2002 | Sueda et al. | |
| 2003/0119928 A1 | * | 6/2003 | Tokiwa ...................... | C08J 9/18 |
| | | | | 521/82 |
| 2008/0194573 A1 | | 8/2008 | Feuerbach et al. | |
| 2009/0029143 A1 | | 1/2009 | Kanae et al. | |
| 2010/0022674 A1 | | 1/2010 | Morioka et al. | |
| 2014/0097389 A1 | * | 4/2014 | Chiba ...................... | C08J 9/008 |
| | | | | 252/511 |
| 2016/0009888 A1 | * | 1/2016 | Oikawa .................. | C08J 9/0061 |
| | | | | 521/57 |
| 2019/0263993 A1 | * | 8/2019 | Takagi ....................... | C08J 9/16 |
| 2020/0032024 A1 | * | 1/2020 | Takagi ..................... | C08J 9/232 |

FOREIGN PATENT DOCUMENTS

| | | |
|---|---|---|
| CN | 1369520 A | 9/2002 |
| CN | 1252171 C | 4/2006 |
| CN | 1939959 A | 4/2007 |
| CN | 101155864 A | 4/2008 |
| CN | 101528827 A | 9/2009 |
| CN | 103724653 A | 4/2014 |
| EP | 1861454 A1 | 12/2007 |
| JP | S51-124157 A | 10/1976 |
| JP | H03-2230 A | 1/1991 |
| JP | H05-009329 A | 1/1993 |
| JP | 2000-154270 A | 6/2000 |
| JP | 2001-164021 A | 6/2001 |
| JP | 2003-147116 A | 5/2003 |
| JP | 2003-206364 A | 7/2003 |
| JP | 2004-027124 A | 1/2004 |
| JP | 2005-023302 A | 1/2005 |
| JP | 2005-060566 A | 3/2005 |
| JP | 2006-022138 A | 1/2006 |

(Continued)

OTHER PUBLICATIONS

International Search Report for PCT/JP2017/040078, dated Feb. 13, 2018, and English Translation submitted herewith (5 pages).
Extended European Search Report issued in corresponding EP Application No. 17868815.6 dated Jun. 4, 2020 (8 pages).
The Dow Chemical Company, INFUSE 9530 Olefin Block Copolymer Safety Data Sheet, Aug. 2018 (10 pages).
The Dow Chemical Company, INFUSE 9530 Olefin Block Copolymer Technical Information, Sep. 2011 (2 pages).

*Primary Examiner* — Irina Krylova
(74) *Attorney, Agent, or Firm* — Fitch, Even, Tabin & Flannery LLP

(57) ABSTRACT

The present invention is concerned with expanded beads that are olefin-based thermoplastic elastomer expanded beads containing a coloring agent, wherein an apparent density of the expanded beads is 40 to 300 g/L, and an average surface layer membrane thickness (a) is 3 to 25 μm, and a molded article thereof, and is able to provide expanded beads capable of producing an expanded beads molded article which is excellent in in-mold moldability and excellent in tensile characteristics and an expanded beads molded article using the expanded beads.

9 Claims, No Drawings

(56) References Cited

FOREIGN PATENT DOCUMENTS

| | | | |
|---|---|---|---|
| JP | 2006-232939 | A | 9/2006 |
| JP | 2007-169527 | A | 7/2007 |
| JP | 2008-533289 | A | 8/2008 |
| JP | 2008266589 | * | 11/2008 |
| JP | 2010-222546 | A | 10/2010 |
| JP | 4669301 | B2 | 4/2011 |
| JP | 2011-132356 | A | 7/2011 |
| JP | 2011-184574 | A | 9/2011 |
| JP | 2011184574 | * | 9/2011 |
| JP | 2012-201820 | A | 10/2012 |
| JP | 5122951 | B2 | 1/2013 |
| JP | 2013-064137 | A | 4/2013 |
| JP | 2013-100555 | A | 5/2013 |
| JP | 5254103 | B2 | 8/2013 |
| JP | 2014-077045 | A | 5/2014 |
| JP | 2014-173012 | A | 9/2014 |
| JP | 2015-108033 | A | 6/2015 |
| JP | 2016-222807 | A | 12/2016 |
| WO | 2005/000958 | A1 | 1/2005 |
| WO | 2006/099631 | A1 | 9/2006 |
| WO | 2013/132957 | A1 | 9/2013 |
| WO | 2016/136875 | A1 | 9/2016 |
| WO | 2016/181714 | A1 | 11/2016 |

* cited by examiner

FOAM PARTICLES, AND MOULDED ARTICLE THEREOF

CROSS-REFERENCE TO RELATED APPLICATIONS

This application is a U.S. national phase application filed under 35 U.S.C. § 371 of International Application Number PCT/JP2017/040078, filed Nov. 7, 2017, designating the United States, which claims priority from Japanese Application Number 2016-220598, filed Nov. 11, 2016.

FIELD OF THE INVENTION

The present invention relates to olefin-based thermoplastic elastomer expanded beads containing a coloring agent and an expanded beads molded article thereof.

BACKGROUND OF THE INVENTION

Expanded polyolefin-based resin beads can be molded into various shapes depending on purposes thereof. An expanded polyolefin-based resin beads molded article obtained from the expanded beads through in-mold molding is applied to a wide range of purposes including various kinds of a packaging or cushioning material, a shock absorber for automobiles, a building material, and the like. But, in the case of using a conventionally known expanded polyolefin-based resin beads molded article for purposes including a seat cushioning material, a pad material for sporting, a shoe sole material, and the like, there is a case where the expanded polyolefin-based resin beads molded article is insufficient in repulsion, flexibility, and restorability.

Meanwhile, an olefin-based thermoplastic elastomer (hereinafter sometimes referred to as "TPO") is a material which is flexible, excellent in repulsion characteristics, and small in compression set.

As an expanded article made of this TPO (hereinafter sometimes referred to as "TPO molded article"), an expanded article containing an ethylene/α-olefin multi-block copolymer is proposed (see, for example, PTLs 1 and 2).

CITATION LIST

Patent Literature

PTL 1: JP 2011-184574 A
PTL 2: JP 2008-533289 A

SUMMARY OF INVENTION

Molded articles having a desired shape are obtained by subjecting expanded beads made of, as a base material resin, a thermoplastic resin, such as a polypropylene-based resin and a polystyrene-based resin, to in-mold molding, and these molded articles are used in various fields while taking the advantage of their characteristics. In order to thoroughly reveal mechanical physical properties of the foregoing expanded beads molded articles, it is necessary to fusion-bond the expanded beads to each other. Furthermore, for in-mold molding of expanded beads, it is required that a molded article conforming a shape of a mold is obtained.

Meanwhile, PTL 1 discloses a TPO expanded article obtained by pressure one step expansion of melt kneading a blend composed of TPO, a crosslinking agent, a blowing agent, an auxiliary blowing agent, and the like to obtain an expandable resin composition, hermetically sealing this in a mold, heating in a pressurized state, and then opening the mold to remove the pressure, followed by expansion. However, PTL 1 does not review expanded beads obtained by expanding TPO particles and the in-mold molding method thereof.

In addition, PTL 2 discloses non-crosslinked TPO expanded article beads and discloses that goods can be obtained by charging the expanded article beads in a mold, compressing the mold to perform compression molding, and then performing heating with a heat source, such as steam, to fusion-bond the expanded article beads. However, PTL 2 does not review at all in-mold moldability of the TPO expanded beads.

In consequence, the TPO expanded beads that are excellent in-mold moldability have not been obtained yet.

Furthermore, it has been noted that there is caused a problem that when the TPO expanded beads containing a coloring agent are subjected to in-mold molding, the fusion bonding of the expanded beads is liable to become insufficient, or a problem that when the heating temperature at the time of molding is increased so as to subject the expanded beads to sufficient fusion bonding, the expanded beads molded article obtained after mold release is liable to generate remarkable compression or deformation (molding sink), so that the in-mold moldability is rather lowered as compared with the case of not containing the coloring agent.

Then, for the purpose of obtaining TPO expanded beads which are excellent especially in in-mold moldability, the present inventors have found that the aforementioned problem may be solved by adopting the following constitutions, thereby leading to accomplishment of the present invention.

Specifically, the present invention is as follows.

[1] Expanded beads, which are olefin-based thermoplastic elastomer expanded beads containing a coloring agent, and have an apparent density of 40 to 300 g/L and an average surface layer membrane thickness (a) of 3 to 25 μm.

[2] The expanded beads as set forth in the above [1], which have an average cell diameter (b) of 50 to 250 μm, provided that a ratio (b/a) of the average cell diameter (b) to the average surface layer membrane thickness (a) is from 5 to 15.

[3] The expanded beads as set forth in the above [1] or [2], wherein the olefin-based thermoplastic elastomer constituting the expanded beads is a multi-block copolymer of a polyethylene block and an ethylene/α-olefin copolymer block.

[4] The expanded beads as set forth in any of the above [1] to [3], which are crosslinked expanded beads, provided that a proportion of a xylene insoluble fraction of the crosslinked expanded beads by a hot xylene extraction method is from 30 to 70% by mass.

[5] The expanded beads as set forth in any of the above [1] to [4], wherein the coloring agent is an inorganic pigment and/or an organic pigment (an inorganic pigment, an organic pigment, or an inorganic pigment and an organic pigment), and a blending amount of the coloring agent in the expanded beads is from 0.1 to 3.0 parts by mass based on 100 parts by mass of the olefin-based thermoplastic elastomer constituting the expanded beads.

[6] An expanded beads molded article, which is obtained by subjecting the expanded beads as set forth in any of the above [1] to [5] to in-mold molding.

[7] The expanded beads molded article as set forth in the above [6], which has a tensile elongation of 140% or more.

In accordance with the present invention, in view of the fact that the olefin-based thermoplastic elastomer expanded beads containing a coloring agent have an apparent density of 40 to 300 g/L and a specified average surface layer membrane thickness, the in-mold moldability of the expanded beads is improved. Furthermore, the expanded beads molded article obtained by subjecting the expanded beads of the present invention to in-mold molding is an expanded beads molded article which is excellent in tensile characteristics because in particular, the expanded beads constituting the molded article are firmly fusion-bonded to each other.

DESCRIPTION OF EMBODIMENTS

[Expanded Beads]

The expanded beads of the present invention are expanded beads of an olefin-based thermoplastic elastomer.

The expanded beads of the present invention are hereunder described in detail.

(Olefin-Based Thermoplastic Elastomer)

The olefin-based thermoplastic elastomer (TPO) as referred to in the present invention means a thermoplastic elastomer composed of, as a hard segment, a polyolefin, such as polypropylene and polyethylene and, as a soft segment, a rubber component, such as an ethylene-propylene rubber.

In general, the TPO is roughly classified into a blend type of a polyolefin and a rubber component, a dynamically crosslinked type, and a polymerized type. Specifically, examples of the TPO include a structure in which an ethylene-propylene rubber (EPM) is dispersed in polypropylene; a structure in which a crosslinked or partially crosslinked ethylene-propylene-diene rubber (EPDM) is dispersed in polypropylene; a random copolymer of ethylene and an $\alpha$-olefin, such as propylene and butene; and a block copolymer of a polyethylene block and an ethylene/$\alpha$-olefin copolymer block.

The olefin-based thermoplastic elastomer constituting the expanded beads of the present invention is preferably a block copolymer having a hard segment composed of a polyethylene block and a soft segment composed of an ethylene/$\alpha$-olefin copolymer block (such a block copolymer will be hereinafter also referred to as "bTPO"), and more preferably a multi-block copolymer. As for the bTPO, in the case of comparison with the TPO having the same durometer hardness, it may be considered that as a crystal of the bTPO is aligned at the time of expansion, a favorable foam membrane is formed. For that reason, it may be considered that expanded beads that are excellent in in-mold moldability are provided. The bTPO may contain a third block other than the polyethylene block and the ethylene/$\alpha$-olefin copolymer block.

A proportion of the component of a structural unit derived from ethylene in the polyethylene block is preferably more than 95% by mass, and more preferably more than 98% by mass relative to a mass of the polyethylene block, and it is still more preferred that the polyethylene block is all constituted of an ethylene unit. Meanwhile, in the ethylene/$\alpha$-olefin copolymer block, a proportion of the component of a structural unit derived from the $\alpha$-olefin is preferably more than 5% by mass, more preferably more than 10% by mass, and still more preferably 15% by mass relative to a mass of the ethylene/$\alpha$-olefin copolymer block.

A proportion of the ethylene/$\alpha$-olefin copolymer block in the bTPO is preferably 1 to 99% by mass, and more preferably 5 to 95% by mass relative to a mass of the multi-block copolymer. The proportion of the polyethylene block and the proportion of the ethylene/$\alpha$-olefin copolymer block can be calculated on a basis of data obtained through differential scanning calorimetry (DSC) or nuclear magnetic resonance (NMR).

The ethylene/$\alpha$-olefin copolymer block is preferably a block of a copolymer of at least one $C_3$-$C_{20}$ $\alpha$-olefin and ethylene.

In the ethylene/$\alpha$-olefin copolymer block, examples of the $\alpha$-olefin which is copolymerized with ethylene include propylene, 1-butene, 1-pentene, 1-hexene, 1-heptene, 1-octene, 1-nonene, 1-decene, 3-methyl-1-butene, and 4-methyl-1-pentene, and these can be used in combination. From the viewpoints of easiness of industrial availability, various characteristics, economy, and so on, examples of the $\alpha$-olefin include propylene, 1-butene, 1-hexene, and 1-octene, and 1-octene is especially preferred from the viewpoints of expandability and in-mold moldability.

Examples of the bTPO include the ethylene/$\alpha$-olefin copolymer described in PTL 1, and for example, "INFUSE", a trade name, manufactured by The Dow Chemical Company and the like are commercially available.

The expanded beads of the present invention contain a coloring agent. The TPO expanded beads containing a coloring agent tend to be lowered in in-mold moldability as compared with those not containing a coloring agent. That is, when the TPO expanded beads containing a coloring agent are subjected to in-mold molding, the fusion bonding of the expanded beads is liable to become unsatisfactory, whereas when the heating temperature at the time of molding is increased so as to make the fusion bonding of the expanded beads satisfactory, the expanded beads molded article obtained after mold release is liable to generate remarkable compression or deformation (molding sink). Nevertheless the expanded beads of the present invention contain a coloring agent, in view of the fact that they have an average surface layer membrane thickness falling within a specified range as described later, expanded beads which are excellent in in-mold moldability are provided.

[Coloring Agent]

As the coloring agent, inorganic or organic pigments or dyes can be used.

Examples of the organic pigment include monoazo-based, fused azo-based, anthraquinone-based, isoindolinone-based, heterocyclic, perinone-based, quinacridone-based, perylene-based, thioindigo-based, dioxazine-based, phthalocyanine-based, nitroso-based, and organic fluorescent pigments.

Examples of the inorganic pigment include titanium oxide, carbon black, Titan Yellow, iron oxide, ultramarine blue, cobalt blue, a calcined pigment, a metallic pigment, mica, a pearl pigment, zinc white, precipitated silica, and cadmium red.

Examples of the dye include an organic dye, such as anthraquinone-based, heterocyclic, and perinone-based organic dyes, a basic dye, an acidic dye, and a mordant dye.

Of these coloring agents, from the viewpoint of weather resistance, it is preferred to use an organic pigment or an inorganic pigment. When the TPO expanded beads contain a pigment, in particular, the in-mold moldability is lowered; however, in view of the fact that the expanded beads of the present invention have an average surface layer membrane thickness falling within a specified range, expanded beads which are excellent in in-mold moldability are provided.

The coloring agent may be used alone or may be used in combination of two or more thereof.

By feeding the coloring agent together with the raw material TPO into an extruder and kneading the both under heating, the coloring agent can be blended in the TPO particles. By expanding such TPO particles containing a coloring agent, the TPO expanded beads containing a coloring agent can be obtained.

Although the amount of the coloring agent contained in the expanded beads is not particularly limited, it is preferably 0.01 to 10 parts by mass, and more preferably 0.1 to 5 parts by mass based on 100 parts by mass of the TPO.

(Average Cell Diameter of Expanded Beads)

In the expanded beads of the present invention, an average cell diameter (b) is preferably 50 to 250 μm. When the average cell diameter (b) is 50 μm or more, the cells constituting the foams are hardly broken upon heating at the time of in-mold molding, the expanded beads become especially excellent in secondary expandability, and the expanded beads molded article after in-mold molding becomes especially excellent in restorability. On the other hand, when the average cell diameter (b) is 250 μm or less, the fusion bondability of the expanded beads to each other is especially excellent at the time of in-mold molding, and an expanded beads molded article which is excellent in mechanical physical properties, such as repulsion and tensile physical properties, is readily obtained. From the aforementioned viewpoints, the average cell diameter (b) is more preferably 60 to 240 μm, still more preferably 70 to 230 μm, and most preferably 80 to 220 μm.

(Measurement of Average Cell Diameter of Expanded Beads)

In the present invention, the aforementioned average cell diameter (b) of the expanded beads is measured in conformity with ASTM D3576-77 as follows.

A cut surface obtained by dividing the expanded bead into approximately two parts is photographed with a scanning electron microscope. In the resulting cross-sectional photograph, four line segments are drawn at equal angles from the outermost surface of the expanded bead to the outermost surface on the opposite side while passing through the center. The number of cells intersecting each of the line segments is measured, respectively; an average chord length of cell is determined by dividing a total length of the four line segments by the number of all cells intersecting the line segments; and the average chord length is further divided by 0.616, thereby determining an average value of the cell diameter of the expanded beads. This operation is performed with respect to at least 30 or more expanded beads, and an arithmetic average value of the average value of the cell diameter of each of the expanded beads is defined as the average cell diameter (b).

(Average Surface Layer Membrane Thickness of Expanded Beads)

In the expanded beads of the present invention, an average surface membrane thickness (a) is 3 to 25 μm. In the case where the average surface layer membrane thickness is less than 3 μm, the cells in the vicinity of the expanded beads surface are liable to be broken, so that there is a concern that a favorable expanded beads molded article is not obtained. On the other hand, in the case where the average surface layer membrane thickness (a) is more than 25 μm, the expanded beads are hardly fusion-bonded to each other at the time of in-mold molding, and it becomes difficult to firmly fusion-bond the expanded beads to each other, so that there is a concern that the tensile characteristics are lowered.

From the aforementioned viewpoints, the average surface layer membrane thickness (a) is preferably 4 to 23 μm, and more preferably 5 to 20 μm.

(Measurement of Average Surface Layer Thickness of Expanded Beads)

In the present invention, the average surface layer membrane thickness (a) of the expanded beads is measured as follows.

The expanded bead is divided into approximately two parts, and the vicinity of the surface of the expanded beads on the cut surface is enlarged and photographed with a scanning electron microscope. In the resulting cross-sectional photograph, ten or more cells positioning on the outermost surface of the expanded bead are randomly selected; a thickness of the thinnest part of the cell membrane (surface layer membrane) on the expanded beads surface side is measured; and an arithmetic average value of those values is defined as an average value of the surface layer membrane thickness of the expanded beads. This operation is performed with respect to at least 30 or more expanded beads, and an arithmetic average value of the average value of the surface layer membrane thickness of each of the expanded beads is defined as the average surface layer membrane thickness (a).

[Ratio (b/a) of Average Cell Diameter (b) to Average Surface Layer Membrane Thickness (a) of Expanded Beads]

In the expanded beads of the present invention, a ratio (b/a) of the average cell diameter (b) to the average surface layer membrane thickness (a) is preferably 5 to 15. When the ratio (b/a) is in a range of 5 to 15, a balance between the cell diameter and the surface layer membrane thickness is excellent, and therefore, secondary expandability and fusion bondability at the time of in-mold molding are more improved, and a favorable expanded beads molded article which is more excellent in tensile characteristics can be obtained. From the aforementioned viewpoint, the foregoing ratio is more preferably 8 to 12.

(Re: Average Cell Membrane Thickness of Expanded Beads)

An average cell membrane thickness (Tm) of the expanded beads is calculated from the average cell diameter b measured by the aforementioned method according to the following expression.

$$V_s = (\rho f - \rho g)/(\rho s - \rho g) = [(b+Tm)^3 - b^3]/(b+Tm)^3 \tag{1}$$

Here, $V_s$ is a volume fraction of the TPO; $\rho f$ is an apparent density (g/cm³) of the expanded beads; $\rho s$ is a density (g/cm³) of the TPO; $\rho g$ is a gas density (g/cm³) within the cell; b is an average cell diameter (μm); and Tm is an average cell membrane thickness (μm). In the expression (1), in view of the fact that $\rho f \gg \rho g$ and $\rho s \gg \rho g$, $\rho g$ can be made 0 (g/cm³), and the expression (1) can be considered to be $V_s = \rho f/\rho s$. In consequence, the average cell membrane thickness Tm (μm) can be calculated according to an expression: $Tm = b \cdot [(1-\rho f/\rho s)^{-1/3} - 1]$. When the average cell diameter b of the expanded beads is determined, then the average cell membrane thickness (Tm) of the expanded beads is determined according to this expression.

The expression (1) is a relational expression between the average cell diameter and the average cell membrane thickness when the shape of the cell is considered to be spherical and described in 222th Item "1.3.2 Section" of Plastic Foam Handbook (published by NIKKAN KOGYO SHIMBUN, LTD., Feb. 28, 1973).

In the expanded beads of the present invention, when the average cell membrane thickness Tm is defined as (c), a ratio (c/a) of (c) to the average surface layer membrane thickness (a) is preferably 0.3 or more and less than 1.0, more preferably 0.3 to 0.8, and still more preferably 0.3 to 0.7. When the foregoing ratio falls within the aforementioned range, a balance between the cell membrane and the surface layer membrane thickness of the expanded beads is excellent, and therefore, secondary expandability and fusion bondability at the time of in-mold molding are more improved, and a favorable expanded beads molded article which is more excellent in tensile characteristics can be obtained.

(Apparent Density of Expanded Beads)

An apparent density of the expanded beads of the present invention is 40 to 300 g/L. By allowing the apparent density of the expanded beads to fall within the aforementioned range, lightweight properties, flexibility, and repulsion of the expanded beads molded article produced by subjecting the expanded beads to in-mold molding can be made more favorable. From the aforementioned viewpoint, the apparent density of the expanded beads is preferably 50 to 250 g/L, more preferably 60 to 200 g/L, and still more preferably 80 to 180 g/L.

(Average Particle Diameter of Expanded Beads)

An average particle diameter of the expanded beads of the present invention is preferably 0.5 to 10 mm, more preferably 1 to 8 mm, and still more preferably 2 to 5 mm. When the average particle diameter of the expanded beads falls within the aforementioned range, not only the production of the expanded beads is easy, but also when the expanded beads are subjected to in-mold molding, the filling properties into a cavity of the mold are improved. The average particle diameter of the expanded beads can be, for example, controlled by regulating the amount of a blowing agent, an expansion condition, a particle diameter of the TPO particles, and the like.

The average particle diameter of the expanded beads and the apparent density of the expanded beads can be measured in the following manner. A measuring cylinder having water at 23° C. placed therein is prepared, and an arbitrary amount of a group of the expanded beads (mass of the group of the expanded beads: W1) is immersed in water in the measuring cylinder with a device, such as a metallic mesh. A volume V1 [L] of the group of the expanded beads is measured by reading the elevation of the water level taking a volume of the device, such as a metallic mesh, into consideration. The volume V1 is divided by the number (N) of the expanded beads having been placed in the measuring cylinder (V1/N), thereby calculating an average volume per one of the expanded beads. A diameter of the virtual true sphere having the same volume as the resulting average volume is defined as the average particle diameter (mm) of the expanded beads. In addition, the apparent density of the expanded beads can be determined by dividing the mass W1 (g) of the group of the expanded beads having been placed in the measuring cylinder by the volume V1 (W1/V1).

(Xylene Insoluble Fraction of Expanded Beads by Hot Xylene Extraction Method)

In the present invention, from the viewpoint of in-mold moldability, the expanded beads are preferably crosslinked expanded beads. Furthermore, a proportion of a xylene insoluble fraction of the crosslinked expanded beads by a hot xylene extraction method is more preferably 30 to 70% by mass, still more preferably 35 to 60% by mass, and especially preferably 40 to 55% by mass.

The xylene insoluble fraction is one of indices exhibiting the crosslinked state of the TPO constituting the expanded beads and can be measured by the following method.

Approximately 1.0 g of expanded beads are weighed and defined as a sample mass W2; the weighed expanded beads are put into a 150-mL round bottom flask; 100 mL of xylene is added; the contents are heated for refluxing by boiling the xylene with a mantle heater for 6 hours; thereafter, a residue left undissolved is filtered with a 100-mesh metallic mesh and separated; the residue is dried with a vacuum drier at 80° C. for 8 hours; a mass W3 of the resulting dry product on this occasion is measured; and a weight percentage of this mass W3 to the sample mass W2[(W3/W2)×100] (%) is determined as the proportion of the xylene insoluble fraction.

A type A durometer hardness of the olefin-based thermoplastic elastomer (TPO) constituting the expanded beads of the present invention is preferably 65 to 95. When the type A durometer hardness falls within the aforementioned range, the expanded beads become excellent especially in in-mold moldability, and an expanded beads molded article having flexibility and repulsion elasticity characteristic to the TPO can be obtained. From such viewpoints, a lower limit of the type A durometer hardness of the TPO is more preferably 70, and still more preferably 80. On the other hand, an upper limit of the type A durometer hardness of the TPO is more preferably 90.

The type A durometer hardness means a durometer hardness (HDA) measured using a type A durometer on a basis of JIS K7215-1986. On the occasion of measuring the durometer hardness of the TPO constituting the expanded beads, a large number of expanded beads are heat pressed to completely remove cells, thereby producing a sheet having a thickness of 4 mm, and the sheet is used as a test piece.

A melt flow rate of the raw material TPO at 190° C. and a load of 2.16 kg can be selected within a range of preferably 2 to 10 g/10 min, more preferably 3 to 8 g/10 min, and still more preferably 4 to 7 g/10 min. When the melt flow rate falls within the aforementioned range, the fusion bondability of the expanded beads is especially favorable, and furthermore, the restorability of the expanded beads molded article after in-mold molding becomes more excellent. The melt flow rate is a value measured under a condition at a temperature of 190° C. and a load of 2.16 kg on a basis of JIS K7210-1:2014.

A density of the raw material TPO is preferably 700 to 1,000 g/L, more preferably 800 to 900 g/L, and still more preferably 850 to 890 g/L.

A melting temperature of the raw material TPO is preferably 110 to 150° C., and more preferably 115 to 140° C. When the melting temperature of the raw material TPO falls within the aforementioned range, expanded beads which are excellent especially in expandability and more excellent in in-mold moldability are readily obtained, and a compression set of the expanded beads molded article at a high temperature can be made small. The melting temperature of the raw material TPO is measured in conformity with the heat flux differential scanning calorimetry described in JIS K7121-1987. Specifically, the raw material TPO is heated from 30° C. to 200° C. at a heating rate of 10° C./min, then cooled to 30° C. at a cooling rate of 10° C./min, and again heated from 30° C. to 200° C. at a heating rate of 10° C./min to provide a DSC curve, and the melting temperature can be obtained from a peak temperature of an endothermic peak determined by the DSC curve. In the case where plural endothermic peaks appear in the DSC curve for the aforementioned second heating, the peak temperature of the endothermic peak having a largest area is defined as the melting temperature.

A flexural modulus of the raw material TPO is preferably 10 to 100 MPa, more preferably 12 to 50 MPa, still more preferably 15 to 40 MPa, and most preferably 20 to 35 MPa. The flexural modulus of the TPO is a value measured on a basis of JIS K7171:2008. As a test piece, one obtained by heat pressing the TPO at 230° C. to produce a 4 mm-thick sheet and cutting out the sheet in a size of 80 mm in length×10 mm in width×4 mm in thickness (standard test piece) is used. In addition, both a radius R1 of an indenter and a radius R2 of a pedestal are set to 5 mm, a distance between supporting points is set to 64 mm, and a test speed is set to 2 mm/min.

The TPO expanded beads may further contain an additional polymer, such as a thermosetting resin, e.g., polystyrene and polyethylene, and a thermoplastic elastomer other than the TPO, within a range where the object and effects of the present invention are not impaired. In the case of blending such an additional polymer, its blending amount is preferably 10 parts by mass or less, and more preferably 5 parts by mass or less based on 100 parts by mass of the TPO.

[Production Method of Expanded Beads]

The expanded beads of the present invention are not particularly limited with respect to a production method thereof and can be produced by expanding particles of the TPO (hereinafter also referred to as "TPO particles"). For example, the TPO particles are dispersed in a dispersing medium within a closed vessel; the TPO particles are impregnated with a blowing agent under an elevated pressure, and preferably further under heating; and the TPO particles containing the blowing agent are released and expanded under a temperature condition suitable for expansion from the closed vessel to a pressure lower than the pressure within the closed vessel (usually under atmospheric pressure), whereby the expanded beads can be obtained. The foregoing expansion method is hereinafter also referred to as "dispersing medium release expansion method". In addition, the expanded beads can also be obtained by impregnating the TPO particles with a blowing agent within a closed vessel and then taking out from the closed vessel without being expanded, to prepare expandable particles; or kneading the TPO and a blowing agent within an extruder, extruding the kneaded material from a die attached to the extruder into water or the like without being expanded, cutting the resultant in a granular state, to prepare expandable particles, and heating and expanding the resulting expandable particles.

(Granulation Step)

The TPO particles in a non-expanded state are produced by a known granulation method, such as a method of feeding the raw material TPO into an extruder and kneading to prepare a molten kneaded material and extruding the molten kneaded material from the extruder, followed by cutting in a size suitable for the expanded beads. For example, in the aforementioned method, the TPO particles can be obtained by extruding the molten kneaded material of the TPO in a strand form through a die attached to the extruder and having small holes and then cooling the strand through water cooling, followed by cutting in a predetermined length. Besides, the TPO particles can be obtained by a hot cutting method of cutting the molten kneaded material of the TPO immediately after extruding through a die, or an underwater cutting method of cutting in water.

In general, an average mass per one of the TPO particles is preferably 0.1 to 20 mg, and more preferably 0.2 to 10 mg.

The average mass of the TPO particles can be determined by randomly selecting 100 or more of the TPO particles, measuring a mass (mg) of a group of the TPO particles, and dividing the mass by the number of the TPO particles used for the measurement.

The TPO particles may be blended with a known additive, such as a flame retardant, a flame retarding assistant, a plasticizer, an antistatic agent, an antioxidant, an ultraviolet ray inhibitor, a photostabilizer, a conductive filler, and an antibacterial agent. Such an additive can be blended in the TPO particles upon kneading together with the TPO on the occasion of granulating the TPO particles.

It is preferred that a cell controlling agent is blended in the TPO particles. Examples of the cell controlling agent include an inorganic cell controlling agent, such as talc, mica, zinc borate, calcium carbonate, silica, titanium oxide, gypsum, zeolite, borax, aluminum hydroxide, and carbon, and besides, an organic cell controlling agent, such as a phosphoric acid-based compound, a phenol-based compound, an amine-based compound, and a polyethylene fluoride-based resin powder, e.g., polytetrafluoroethylene (PTFE). The cell controlling agent can be contained in the TPO particles upon kneading together with the raw material TPO by an extruder in a step of obtaining the TPO particles. A blending proportion of the cell controlling agent in the TPO particles is preferably 0.01 to 1 part by mass based on 100 parts by mass of the TPO.

As the cell controlling agent, it is preferred to use a granular material of 0.01 to 50 µm, and more preferably 0.1 to 30 µm. The average particle diameter means a 50% volume average particle diameter (d50) and can be measured by a centrifugal sedimentation particle size measurement method.

Expanded beads having target average cell diameter and average surface layer membrane thickness can be obtained by changing an expansion condition, such as the kind and addition amount of the cell controlling agent, an expansion method, an addition amount of the blowing agent, an expansion temperature, and an expansion atmosphere temperature, and characteristics of the TPO, or other means. For example, in the case of comparing expanded beads having the same apparent density, when the addition amount of the cell controlling agent is increased, the number of cell nuclei increases, and therefore, the number of cells in the expanded beads increases, so that the cell becomes small, and the average cell diameter becomes small.

The production method the expanded beads of the present invention is described while referring to the dispersing medium release expansion method as an example. In the case of obtaining the expanded beads by the dispersing medium release expansion method, expanded beads having a thin average surface layer membrane thickness (a) are readily obtained, and in particular, such is preferred from the viewpoint that a cell structure having a ratio (c/a) of the average cell membrane thickness Tm (c) to the average surface layer membrane thickness (a) of 0.3 or more and less than 1.0 is readily formed.

(Dispersion Step of TPO Particles)

The olefin-based thermoplastic elastomer (TPO) particles can be dispersed in a dispersing medium, such as water, within a closed vessel. On the occasion of dispersing the TPO particles, for example, an agitator can be used.

(Dispersing Medium)

The dispersing medium is not particularly limited so long as it is a dispersing medium which does not dissolve the TPO particles therein. Examples of the dispersing medium include water, ethylene glycol, glycerin, methanol, and ethanol. The dispersing medium is preferably water.

In the dispersion step, a dispersant may be further added to the dispersing medium. Examples of the dispersant include an organic dispersant, such as polyvinyl alcohol, polyvinylpyrrolidone, and methyl cellulose, and a sparingly soluble inorganic salt, such as aluminum oxide, zinc oxide, kaolin, mica, magnesium phosphate, and tricalcium phosphate. In addition, a surfactant can be further added to the dispersing medium. Examples of the surfactant include sodium oleate and sodium dodecylbenzenesulfonate, and also include an anionic surfactant and a nonionic surfactant that are generally used.

(Closed Vessel)

The closed vessel is not particularly limited so long as the vessel can be closed air-tightly. On the occasion of impregnation of the blowing agent, or the like, the pressure inside the closed vessel increases, and therefore, the closed vessel necessarily withstands the increase of the pressure. The closed vessel is, for example, an autoclave.

(Impregnation Step of Blowing Agent into TPO Particles)

The blowing agent for expanding the TPO particles is added to the dispersing medium within the closed vessel, and the blowing agent can be impregnated under an elevated pressure, and preferably further under heating. Although a temperature for impregnating the blowing agent is not particularly limited, it is preferably a temperature equal to or higher than a temperature at which the TPO particles become in a softened state, and for example, it is preferably in a range of 100 to 180° C., more preferably 130 to 170° C., and still more preferably 140 to 165° C.

(Blowing Agent)

The blowing agent to be used is not particularly limited so long as it is able to expand the TPO particles. Examples of the blowing agent include an inorganic physical blowing agent, such as air, nitrogen, carbon dioxide, argon, helium, oxygen, and neon; and an organic physical blowing agent, such as an aliphatic hydrocarbon, e.g., propane, n-butane, isobutane, n-pentane, isopentane, and n-hexane, an alicyclic hydrocarbon, e.g., cyclohexane and cyclopentane, a halogenated hydrocarbon, e.g., chlorofluoromethane, trifluoromethane, 1,1-difluoroethane, 1,1,1,2-tetrafluoroethane, methyl chloride, ethyl chloride, and methylene chloride, and a dialkyl ether, e.g., dimethyl ether, diethyl ether, and methyl ethyl ether. Among these, an inorganic physical blowing agent is preferred because it does not deplete the ozone layer and is inexpensive; and nitrogen, air, and carbon dioxide are more preferred. In particular, in view of the fact that the expanded beads having a specified cell structure of the present invention are readily obtained, carbon dioxide is still more preferred. These blowing agents can be used either alone or in combination of two or more thereof. Although a blending amount of the blowing agent is determined in consideration of an apparent density of the target expanded beads, the kind of the TPO, the kind of the blowing agent, and the like, in general, it is preferred to use 2 to 20 parts by mass of the organic physical blowing agent, or to use 0.5 to 20 parts by mass of the inorganic physical blowing agent, based on 100 parts by mass of the TPO.

(Production of Expanded Beads)

The expanded beads can be produced by heating the temperature of the contents within the closed vessel to a temperature suitable for expansion of the TPO particles and then releasing the TPO particles which have been impregnated with the blowing agent and heated to the temperature suitable for expansion, to an atmosphere having a pressure that is lower than the pressure within the closed vessel, generally to an atmospheric pressure. Specifically, while holding the pressure within the closed vessel, one end of the closed vessel under the water surface is opened to release the TPO particles containing the blowing agent together with the dispersing medium from the interior of the closed vessel to an atmosphere having a pressure that is lower than the pressure within the closed vessel, generally to an atmospheric pressure, thereby producing the expanded beads.

On the occasion of releasing the TPO particles from the closed vessel, in order to reduce a production tolerance of the apparent density or cell diameter of the resulting expanded beads, it is preferred that by applying a back pressure with a gas, such as carbon dioxide and air, the pressure within the vessel as released is kept constant or increased gradually.

On the occasion of releasing the TPO particles to a low pressure, a temperature (expansion temperature) of the contents within the closed vessel is preferably (TM+20° C.) or higher, more preferably (TM+30° C.) to (TM+50° C.), and still more preferably (TM+35° C.) to (TM+45° C.) relative to a melting temperature TM of the raw material TPO. In addition, a pressure within the closed vessel is preferably 0.5 to 4.5 MPa (G), more preferably 1.0 to 4.3 MPa (G), and still more preferably 1.5 to 4.0 MPa (G). The pressure within the closed vessel can be regulated by the temperature of the contents within the vessel, the use amount of the blowing agent, exhaust of the gas within the vessel, and the like. The term "MPa (G)" means a gauge pressure.

In order to more improve the in-mold moldability, the olefin-based thermoplastic elastomer (TPO) expanded beads are preferably crosslinked expanded beads. The crosslinked expanded beads which is expanded beads constituted crosslinked TPO can be obtained by expanding the crosslinked particles constituted TPO, or crosslinking the expanded beads constituted TPO.

The TPO crosslinked particles can be, for example, obtained by dispersing a crosslinking agent together with the TPO particles in a dispersing medium within a closed vessel, heating the dispersion under agitation to a temperature equal to or higher than a temperature at which the crosslinking agent is not substantially decomposed to impregnate the crosslinking agent in the TPO particles in a softened state, and further increasing the temperature to decompose the crosslinking agent, thereby crosslinking the TPO. This crosslinking reaction may be performed at any timing before, during, or after impregnation of the blowing agent. Alternatively, the crosslinked particles which have been crosslinked by other step may be dispersed in the dispersing medium.

It is preferred that the crosslinking reaction is performed at a temperature at which the crosslinking agent is substantially decomposed, specifically at a temperature equal to or higher than a one-hour half-life temperature of an organic peroxide. The crosslinking reaction is performed while holding at this temperature for 1 minute to 200 minutes.

(Crosslinking Agent)

The crosslinking agent which may be used for crosslinking of the TPO is not particularly limited so long as it is able to crosslink the TPO. As the crosslinking agent, a conventionally known organic peroxide can be used. Examples thereof include a Percumyl-based compound, such as dicumyl peroxide and tert-butylcumyl peroxide; a Perbutyl-based compound, such as 1,1-bis(tert-butylperoxy)-3,3,5-trimethylcyclohexane, 2,5-dimethyl-2,5-di(tert-butylperoxy)hexane, and di-tert-butylperoxide; a Perhexyl-based compound, such as tert-hexylperoxybenzoate; and a Perocta-based compound, such as 1,1,3,3-tetramethylbutylperoxy-2-ethylhexanoate. Of these, a Percumyl-based compound and a Perbutyl-based compound are preferred, and dicumyl oxide is more preferred. These can be used either alone or in combination of two or more thereof. A blending amount of the crosslinking agent is preferably 0.1 to 5.0 parts by mass, and more preferably 0.2 to 2.5 parts by mass based on 100 parts by mass of the TPO. When the blending amount of the crosslinking agent falls within the aforementioned range, crosslinked TPO particles having an appropriate crosslinking structure are obtained.

Furthermore, while the method of crosslinking the TPO with an organic peroxide has been described above, the crosslinking treatment is not limited to the use of an organic peroxide, and the crosslinked TPO particles or the crosslinked TPO expanded beads can be prepared by performing the crosslinking treatment by adopting other known method, for example, an electron beam crosslinking method.

[Expanded Beads Molded Article]

An expanded beads molded article can be obtained by subjecting the expanded beads of the present invention to in-mold molding.

(In-Mold Molding)

The expanded beads molded article can be obtained by filling the expanded beads in a cavity of the mold and heating and molding with a heating medium, such as steam, according to a conventionally known in-mold molding method. Specifically, after filling the expanded beads in a cavity of the mold, by introducing a heating medium, such as steam, into the mold, the expanded beads are heated and expanded and also subjected to fusion bonding to each other, whereby the expanded beads molded article in which the shape of a molding space is shaped can be obtained. In addition, the in-mold molding in the present invention is preferably performed by a pressure molding method (see, for example, JP 51-22951 B) in which the expanded beads are subjected in advance to a pressure treatment with a pressurized gas, such as air, to increase the pressure inside the cells of the expanded beads, thereby controlling the pressure inside the expanded beads to a pressure higher by 0.01 to 0.3 MPa(G) than an atmospheric pressure; the expanded beads are then filled in a cavity of the mold under an atmospheric pressure or reduced pressure; and subsequently, a heating medium, such as steam, is fed into the mold, thereby molding the expanded beads through fusion bonding thereof with heat. In addition, the in-mold molding can be performed by a compression filling molding method (see JP 4-46217 B) in which a cavity of the mold pressurized with a compressed gas to an atmospheric pressure or more is filled with expanded beads pressurized to the foregoing pressure or more; and a heating medium, such as steam, is then fed into the cavity for heating, thereby molding the expanded beads through fusion bonding thereof with heat. Besides, the in-mold molding can also be performed by an ambient pressure filling molding method (see JP 6-49795 B) in which expanded beads obtained under a special condition and having a high secondary expansion force are filled in a cavity of a mold under an atmospheric pressure or reduced pressure; and a heating medium, such as steam, is then fed thereinto for heating, thereby molding the expanded beads through fusion bonding thereof with heat, or a method through a combination of the aforementioned methods (see JP 6-22919 B), or the like.

(Apparent Density of Expanded Beads Molded Article)

An apparent density of the expanded beads molded article of the present invention is preferably 40 to 300 g/L, more preferably 45 to 250 g/L, still more preferably 50 to 200 g/L, and especially preferably 55 to 150 g/L. When the apparent density of the molded article falls within the aforementioned range, an expanded beads molded article which is well-balanced and excellent in lightweight properties, flexibility, repulsion, restorability, and tensile characteristics is provided. The apparent density (g/L) of the molded article is determined by dividing a mass W (g) of the molded article by an apparent volume V of the molded article (W/V). The apparent volume V of the molded article can be measured by the water submersed method.

(Fusion Bondability of Expanded Beads Molded Article)

The fusion bondability in the expanded beads molded article can be evaluated by a material destruction ratio obtained in such a manner that the molded article is broken by bending, and the ratio of a value obtained by dividing ruptured expanded beads present on the ruptured cross section by all of the expanded beads exposed on the ruptured cross section is defined.

The material fracture ratio is preferably 80% or more, more preferably 90% or more, and still more preferably 95% or more. When the fusion bondability falls within the aforementioned range, the molded article is excellent in physical properties, such as maximum tensile strength and tensile elongation and can be utilized as a suitable molded article for purposes including a seat cushioning material, a pad material for sporting, a shoe sole material, and the like.

(Tensile Elongation of Expanded Beads Molded Article)

A tensile elongation of the expanded beads molded article is preferably 140% or more. The tensile elongation of the expanded beads molded article is a value measured in conformity with JIS K6767:1999. The tensile elongation is preferably 150% or more, and more preferably 160% or more.

When the tensile elongation is 140% or more, it is suggested that the fusion bondability of the expanded beads of the expanded beads molded article is especially favorable, and the expanded beads molded article is excellent in durability and can be applied to purposes including a seat cushioning material, a pad material for sporting, a shoe sole material, and the like.

The expanded beads obtained by the present invention are excellent in fusion bondability at the time of in-mold molding, and therefore, an expanded beads molded article in which the expanded beads are firmly fusion-bonded to each other can be obtained, and tensile physical properties of the molded article are especially improved.

EXAMPLES

Next, the present invention is described in more detail by reference to Examples, but it should be construed that the present invention is by no means limited by these Examples.

[Evaluation]

The expanded beads and the expanded beads molded articles used in the Examples and Comparative Examples were evaluated in the following manners. These evaluations were performed after conditioning by allowing the resulting expanded beads or expanded beads molded article to stand under a condition at a relative humidity of 50% and 23° C. under 1 atm for 2 days.

(Apparent Density of Expanded Beads)

First of all, 50 mL of water at a temperature of 23° C. was placed in a 100-mL measuring cylinder. Subsequently, a mass (W1) and a number of a group of expanded beads having a bulk volume of approximately 30 cm$^3$ were measured, and the group of the expanded beads were submerged in water in the measuring cylinder with a metallic mesh. A volume V1 (L) of the group of the expanded beads was measured by reading the elevation of the water level taking the volume of the metallic mesh into consideration. By dividing the mass W1 (g) of the group of the expanded beads by the volume V1 (L) (W1/V1), an apparent density (g/L) of the expanded beads was determined.

(Average Particle Diameter of Expanded Beads)

The volume V1 was divided by the number (N) of the expanded beads having been placed in the measuring cylinder (V1/N), thereby calculating an average volume per one of the expanded beads. A diameter of a virtual true sphere having the same volume as the resulting average volume was defined as an average particle diameter (mm) of the expanded beads.

(Average Cell Diameter (b) of Expanded Beads)

First of all, 30 of the expanded beads were randomly selected. Subsequently, each of the expanded beads was divided into approximately two parts, and an enlarged photograph (magnification; 30 times) of a cut surface thereof was taken with a scanning electron microscope. In the enlarged photograph of each of the cut surfaces, four line segments were drawn at equal angles from the outermost surface of the expanded bead to the outermost surface on the opposite side while passing through the center, and the number of cells intersecting each of the line segments was measured, respectively. An average chord length of cell was determined by dividing a total length (actual length) of the four line segments by the number of all cells intersecting the line segments; and the average chord length was further divided by 0.616, thereby determining an average value of the cell diameter of each of the expanded beads. An arithmetic average value of the average value of the cell diameter of each of the expanded beads was defined as an average cell diameter (b) (μm).

(Average Surface Layer Membrane Thickness (a) of Expanded Beads)

First of all, 30 of the expanded beads were randomly selected. Subsequently, each of the expanded beads was divided into approximately two parts, and the vicinity of the surface of the expanded beads on the cut surface was enlarged and photographed in a magnification of 300 times by a scanning electron microscope. In each of the cross-sectional photographs, ten cells positioning on the outermost surface of the expanded bead were randomly selected; a thickness of the thinnest part of the cell membrane (surface layer membrane) on the expanded beads surface side was measured; and an arithmetic average value of those values was defined as an average value of the surface layer membrane thickness of the expanded beads. An arithmetic average value of the average value of the surface layer membrane thickness of each of the expanded beads was defined as an average surface layer membrane thickness (μm).

(Calculation of Average Cell Membrane Thickness (c))

An average cell membrane thickness (c) of the expanded beads was calculated according to the aforementioned expression (1) on a basis of the apparent density pf and the average cell diameter b of the expanded beads. As the ρs, a density of a TPO composition constituting the expanded beads, as measured in the following manner, was adopted. The expanded beads were heat pressed at 230° C. to completely remove cells from the expanded beads, and this heat-pressed material was then cut to produce a sample for measurement in a pellet form. Using this sample for measurement, a density of the TPO composition was measured by the pycnometer method described in JIS K7112:1999.

(Xylene Insoluble Fraction of Expanded Beads)

Approximately 1.0 g of the expanded beads were weighed and defined as a sample mass W2. The weighed expanded beads were put into a 150-mL round bottom flask; 100 mL of xylene was added; the contents were heated for refluxing by boiling the xylene with a mantle heater for 6 hours; thereafter, a residue left undissolved was filtered with a 100-mesh metallic mesh and separated; the residue was dried with a vacuum drier at 80° C. for 8 hours; and a mass W3 of the resulting dry product was measured. A weight percentage of this mass W3 to the sample mass W2 [(W3/W2)×100](%) was defined as a proportion of the xylene insoluble fraction by a hot boiling xylene extraction method.

(Apparent Density of Expanded Beads Molded Article)

A mass of the expanded beads molded article was measured, and this mass was divided by an apparent volume of the expanded beads molded article determined by the water submerged method (water temperature: 23° C.), thereby determining an apparent density (g/L) of the expanded beads molded article.

(Measurement Methods of Tensile Elongation and Tensile Strength of Expanded Beads Molded Article)

(Tensile Strength and Tensile Elongation)

Using a vertical slicer, a mold skin was removed from the expanded beads molded article, and the resultant was cut out in a size of 120 mm×25 mm×10 mm such that all the surfaces thereof were cut surfaces, and further cut out with a jig saw into a No. 1 dumbbell form (having a measurement portion having a length of 40 mm, a width of 10 mm, and a thickness of 10 mm), to prepare a test piece. The test piece was subjected to a tensile test at a test speed of 500 mm/min on a basis of JIS K6767:1999, thereby measuring a tensile strength and a tensile elongation of the expanded beads molded article at the time of breakage.

<Evaluation of In-Mold Moldability>

With respect to the expanded beads, from the viewpoints of in addition to the expanded beads molded article produced through in-mold molding standardly at a molding steam pressure of 0.20 MPa (G), fusion bondability, appearance (gap=degree of void), and restorability (restorability of swelling or contraction after in-mold molding) of the molded article, expanded beads molded articles were molded by changing the molding steam pressure, and the in-mold moldability was evaluated according to the following criteria.

(Fusion Bondability)

The fusion bondability of the expanded beads molded article was evaluated by the following method. The expanded beads molded article was broken by bending, the number (C1) of the expanded beads present on the broken surface and the number (C2) of the destructed expanded beads were obtained, and a ratio of the destructed expanded beads to the expanded beads (C2/C1×100) was calculated as a material fracture ratio. The fusion bondability was evaluated in such a manner that the aforementioned measurement was performed 5 times with different test pieces to determine the material destruction ratios, respectively, and the fusion bondability was evaluated by the arithmetic average thereof according to the following criteria.

A: The material destruction ratio is 90% or more.

B: The material destruction ratio is 20% or more and less than 90%.

C: The material destruction ratio is less than 20%

(Surface Appearance (Degree of Gap)

As for the evaluation of surface appearance, a regular square of 100 mm×100 mm was drawn in a center of one surface of the expanded beads molded article; lines were drawn on the diagonal from one corner of the regular square; and the number of voids (gap) having a size of 1 mm×1 mm or more on the lines were counted and evaluated according to the following criteria.

A: The number of voids is less than 5.

B: The number of voids is 5 or more and less than 10.

C: The number of voids is 10 or more.

(Restorability)

In a tabular expanded beads molded article, a thickness of the vicinity of each of four corners (inside by 10 mm in the central direction from the corner) and a thickness of a center (portion dividing into two equal parts in both the longitudinal direction and the transverse direction) were measured, respectively. Subsequently, a ratio (%) of the thickness of the center to the thickness of a thickest place among the four corners was calculated and evaluated according to the following criteria.

A: The ratio is 95% or more.
B: The ratio is 90% or more and less than 95%.
C: The ratio is less than 90%.

Even if the molding steam pressure is changed, in the case where a molded article with high evaluation is obtained, a moldable condition width is broad, so that it may be judged that the expanded beads have more excellent in-mold moldability. In addition, in the case where molding can be achieved at a low molding pressure, a molding cycle is shortened, and the productivity is improved, and therefore, it may be said that the expanded beads are excellent in in-mold moldability.

Properties and so on of the coloring agents (coloring agent masterbatches) used in the Examples and Comparative Examples are shown in Table 1.

of the TPO particles in Table 2) of dry ice (carbon dioxide) as a blowing agent were further added to the dispersing medium.

The temperature was raised while agitating the contents within the autoclave, and after the temperature of the contents reached 110° C., the system was kept at 110° C. for 30 minutes, thereby impregnating the crosslinking agent and the blowing agent in the TPO particles. Furthermore, after holding, the temperature was further raised, and after the temperature reached 160° C., the system was held at 160° C. for 30 minutes, thereby not only crosslinking the TPO particles but also further impregnating the blowing agent in the TPO particles. At this time, a pressure within the autoclave was 2.5 MPa (G). Thereafter, the contents were released to an atmospheric pressure while keeping the pressure to expand the TPO particles, thereby obtaining expanded beads. An average particle diameter of the expanded beads was 4.2 mm.

<Production of Expanded Beads Molded Article>

As a mold, a mold for molding a flat plate having a rectangular parallelepipedal molding space and having a length of 250 mm, a width of 200 mm, and a thickness of 20 mm was used. The resulting expanded beads were charged in a closed vessel and pressurized with compressed air of 0.2 MPa (G) for 12 hours to impart an internal pressure of

TABLE 1

| Color | Manufacturer | Masterbatch product name | Pigment concentration (mass %) | Main component of pigment | Base material resin |
|---|---|---|---|---|---|
| Blue | Dainichiseika Color & Chemicals Mfg. Co., Ltd. | PE-ME7603 Blue | 23 | Phthalocyanine Blue | LDPE |
| Black | Dainichiseika Color & Chemicals Mfg. Co., Ltd. | PE-M AZ 90086(KE)40 Black | 40 | Carbon black | LDPE |

Example 1

<Production of Olefin-based Thermoplastic Elastomer (TPO) Particles>

100 parts by mass of a multi-block copolymer (a trade name: INFUSE 9530, manufactured by The Dow Chemical Company) having a density of 887 g/L, a melting point of 120° C., a melt flow rate of 5.4 g/10 min (at 190° C. and a load of 2.16 kg), a durometer hardness (HDA), as measured using a type A durometer, of 86, and a flexural modulus of 28 MPa and having a polyethylene block and an ethylene/1-octene copolymer block, 0.1 parts by mass of zinc borate (ZnB: a trade name: Zinc Borate 2335, manufactured by Tomita Pharmaceutical Co., Ltd., average particle diameter d50: 6 μm) as a cell controlling agent, and 1 part by mass of a blue pigment masterbatch (blue pigment: 0.23 parts by mass) as a coloring agent were fed into an extruder and kneaded. The resultant was extruded in a strand form through a die having small holes of 2 mm, and the strand was cooled in water and then cut in a particle mass of approximately 5 mg by using a pelletizer, followed by granulation to obtain TPO particles.

<Production of Expanded Beads>

1 kg of the TPO particles as obtained above and 3 liters of water as a dispersing medium were charged in an autoclave equipped with an agitator and having an internal capacity of 5 liters, and 3 g of kaolin as a dispersant, 0.04 g of a sodium alkylbenzenesulfonate as a surfactant, 8 g of dicumyl peroxide as a crosslinking agent, and 40 g (expressed as "4.0 parts by mass" based on 100 parts by mass ((atmospheric pressure)+0.10 MPa) within the expanded beads. After taking out the expanded beads from the closed vessel, the expanded beads were filled in a state that the mold was opened 4 mm from the completely closed state (length in the thickness direction of the molding space: 24 mm); the mold was then completely closed (length in the thickness direction of the molding space: 20 mm, ratio of cracking: 20%); and thereafter, the expanded beads were subjected to in-mold molding upon heating with steam at a pressure of 0.2 MPa (G) as shown in Table 2. After cooling, the resulting expanded beads molded article were taken out from the mold and heated for drying in an oven regulated at 60° C. for 12 hours, thereby obtaining a tabular expanded beads molded article.

Example 2

Expanded beads and an expanded beads molded article were produced in the same manner as in Example 1, except that on the occasion of producing expanded beads, the amount of carbon dioxide was changed to 25 g (2.5 parts by mass), to regulate the pressure within the autoclave at the time of expansion to 1.8 MPa (G).

Example 3

Expanded beads and an expanded beads molded article were produced in the same manner as in Example 1, except that the cell controlling agent was changed to a powder of polytetrafluoroethylene (PTFE) (a trade name: TFW-1000, manufactured by Seishin Kigyo K. K., average particle diameter: 10 μm); and that the amount of carbon dioxide was changed to 50 g, to regulate the pressure within the autoclave at the time of expansion to 3.0 MPa (G).

Example 4

Expanded beads and an expanded beads molded article were produced in the same manner as in Example 1, except that the cell controlling agent was changed to talc (a trade name; KHP-125B, manufactured by Hayashi Kasei Co., Ltd., average particle diameter: 8 μm); and that the amount of carbon dioxide was changed to 50 g, to regulate the pressure within the autoclave at the time of expansion to 3.0 MPa (G).

Example 5

Expanded beads and an expanded beads molded article were produced in the same manner as in Example 1, except that the amount of zinc borate as the cell controlling agent was changed to 0.05 parts by mass; and that the amount of carbon dioxide was changed to 50 g, to regulate the pressure within the autoclave at the time of expansion to 3.0 MPa (G).

Example 6

Expanded beads and an expanded beads molded article were produced in the same manner as in Example 1, except that the amount of zinc borate as the cell controlling agent was changed to 0.02 parts by mass; and that the amount of carbon dioxide was changed to 50 g, to regulate the pressure within the autoclave at the time of expansion to 3.0 MPa (G).

Example 7

Expanded beads and an expanded beads molded article were produced in the same manner as in Example 1, except that the blending amount of the blue pigment masterbatch was changed to 5 parts by mass (blue pigment: 1.15 parts by mass); and that the amount of carbon dioxide was changed to 50 g, to regulate the pressure within the autoclave at the time of expansion to 3.0 MPa (G).

Example 8

Expanded beads and an expanded beads molded article were produced in the same manner as in Example 1, except that the blue pigment masterbatch was changed to a black pigment masterbatch, and its blending amount was changed to 7 parts by mass (black pigment: 2.8 parts by mass); and that the amount of carbon dioxide was changed to 20 g, to regulate the pressure within the autoclave at the time of expansion to 1.5 MPa (G).

Example 9

Expanded beads and an expanded beads molded article were produced in the same manner as in Example 1, except that the blending amount of the black pigment masterbatch was changed to 1 part by mass (black pigment: 0.4 parts by mass); and that the amount of carbon dioxide was changed to 30 g, to regulate the pressure within the autoclave at the time of expansion to 2.0 MPa (G).

Comparative Example 1

Expanded beads and an expanded beads molded article were produced in the same manner as in Example 1, except that the amount of carbon dioxide was changed to 20 g, to regulate the pressure within the autoclave at the time of expansion to 1.4 MPa (G).

Comparative Example 2

Expanded beads and an expanded beads molded article were produced in the same manner as in Example 1, except that the TPO particles were obtained in the same manner as in Example 1 without using the cell controlling agent; and that the amount of carbon dioxide was changed to 50 g, to regulate the pressure within the autoclave at the time of expansion to 3.0 MPa (G).

TABLE 2

| | | | Example 1 | Example 2 | Example 3 | Example 4 | Example 5 | Example 6 |
|---|---|---|---|---|---|---|---|---|
| TPO particles | Coloring agent | — | Blue pigment | Blue pigment | Blue pigment | Blue pigment | Blue pigment | Blue pigment |
| | Addition amount | Parts by mass *1 | 0.23 | 0.23 | 0.23 | 0.23 | 0.23 | 0.23 |
| | Cell controlling agent | — | ZnB | ZnB | PTFE | Talc | ZnB | ZnB |
| | Addition amount | Parts by mass *1 | 0.1 | 0.1 | 0.1 | 0.1 | 0.05 | 0.02 |
| Expansion condition | Amount of blowing agent | Parts by mass *2 | 4.0 | 2.5 | 5.0 | 5.0 | 5.0 | 5.0 |
| | Impregnation temperature | ° C. | 110 | 110 | 110 | 110 | 110 | 110 |
| | Crosslinking temperature | ° C. | 160 | 160 | 160 | 160 | 160 | 160 |
| | Holding time | min | 30 | 30 | 30 | 30 | 30 | 30 |
| | Expansion temperature | ° C. | 160 | 160 | 160 | 160 | 160 | 160 |
| | Internal pressure of autoclave | MPa (G) | 2.5 | 1.8 | 3.0 | 3.0 | 3.0 | 3.0 |
| Expanded beads | Apparent density | g/L | 101 | 131 | 133 | 138 | 126 | 151 |
| | Average particle diameter | mm | 4.2 | 4.0 | 3.9 | 3.9 | 4.0 | 3.8 |
| | Average surface layer membrane thickness (a) | μm | 9 | 11 | 10 | 9 | 13 | 19 |
| | Average cell diameter (b) | μm | 90 | 98 | 83 | 76 | 118 | 152 |
| | b/a | — | 10 | 8.9 | 8.3 | 8.4 | 9.1 | 8.0 |
| | Average cell membrane thickness (c) | μm | 3.7 | 5.4 | 4.7 | 4.5 | 6.3 | 9.9 |
| | c/a | — | 0.42 | 0.49 | 0.47 | 0.50 | 0.48 | 0.52 |
| | Xylene insoluble fraction | mass % | 55 | 50 | 53 | 54 | 51 | 49 |
| Molding condition | Molding steam pressure | MPa (G) | 0.20 | 0.20 | 0.20 | 0.20 | 0.20 | 0.20 |
| Expanded beads | Apparent density | g/L | 78 | 98 | 89 | 95 | 83 | 100 |
| | Tensile strength | MPa | 0.41 | 0.44 | 0.45 | 0.46 | 0.42 | 0.44 |

TABLE 2-continued

| | | | | | | | | |
|---|---|---|---|---|---|---|---|---|
| molded article | Tensile elongation | % | 202 | 185 | 180 | 175 | 175 | 164 |
| Evaluation of moldability | Molding steam pressure: 0.16 MPa (G) | Fusion bondability | A | A | A | A | C | C |
| | | Surface appearance | A | A | A | A | C | C |
| | | Restorability | A | A | A | A | A | A |
| | Molding steam pressure: 0.18 MPa (G) | Fusion bondability | A | A | A | A | B | B |
| | | Surface appearance | A | A | A | A | B | B |
| | | Restorability | A | A | A | A | A | A |
| | Molding steam pressure: 0.20 MPa (G) | Fusion bondability | A | A | A | A | A | A |
| | | Surface appearance | A | A | A | A | A | A |
| | | Restorability | A | A | A | A | A | A |
| | Molding steam pressure: 0.22 MPa (G) | Fusion bondability | A | A | A | A | A | A |
| | | Surface appearance | A | A | A | A | A | A |
| | | Restorability | C | B | C | B | C | B |

| | | | Example 7 | Example 8 | Example 9 | Comparative Example 1 | Comparative Example 2 |
|---|---|---|---|---|---|---|---|
| TPO particles | Coloring agent | — | Blue pigment | Black pigment | Black pigment | Blue pigment | Blue pigment |
| | Addition amount | Parts by mass *1 | 1.15 | 2.8 | 0.4 | 0.23 | 0.23 |
| | Cell controlling agent | — | ZnB | ZnB | ZnB | ZnB | No |
| | Addition amount | Parts by mass *1 | 0.1 | 0.1 | 0.1 | 0.1 | No |
| Expansion condition | Amount of blowing agent | Parts by mass *2 | 5.0 | 2.0 | 3.0 | 2.0 | 5.0 |
| | Impregnation temperature | °C. | 110 | 110 | 110 | 110 | 110 |
| | Crosslinking temperature | °C. | 160 | 160 | 160 | 160 | 160 |
| | Holding time | min | 30 | 30 | 30 | 30 | 30 |
| | Expansion temperature | °C. | 160 | 160 | 160 | 160 | 160 |
| | Internal pressure of autoclave | MPa (G) | 3.0 | 1.5 | 2.0 | 1.4 | 3.0 |
| Expanded beads | Apparent density | g/L | 98 | 200 | 157 | 214 | 168 |
| | Average particle diameter | mm | 4.2 | 3.4 | 3.8 | 3.3 | 3.7 |
| | Average surface layer membrane thickness (a) | μm | 11 | 19 | 13 | 28 | 26 |
| | Average cell diameter (b) | μm | 100 | 213 | 150 | 113 | 190 |
| | b/a | — | 9.1 | 11.2 | 11.5 | 4.0 | 7.3 |
| | Average cell membrane thickness (c) | μm | 4.0 | 18.0 | 10.1 | 11.0 | 14.0 |
| | c/a | — | 0.36 | 0.95 | 0.77 | 0.39 | 0.54 |
| | Xylene insoluble fraction | mass % | 48 | 50 | 54 | 54 | 52 |
| Molding condition | Molding steam pressure | MPa (G) | 0.20 | 0.20 | 0.20 | 0.20 | 0.20 |
| Expanded beads molded article | Apparent density | g/L | 72 | 145 | 125 | 158 | 120 |
| | Tensile strength | MPa | 0.40 | 0.52 | 0.48 | 0.45 | 0.40 |
| | Tensile elongation | % | 182 | 170 | 165 | 108 | 130 |
| Evaluation of moldability | Molding steam pressure: 0.16 MPa (G) | Fusion bondability | C | B | B | C | C |
| | | Surface appearance | B | B | B | C | C |
| | | Restorability | A | A | A | A | A |
| | Molding steam pressure: 0.18 MPa (G) | Fusion bondability | B | A | A | C | C |
| | | Surface appearance | A | A | A | C | C |
| | | Restorability | A | A | A | A | A |
| | Molding steam pressure: 0.20 MPa (G) | Fusion bondability | A | A | A | B | B |
| | | Surface appearance | A | A | A | C | B |
| | | Restorability | A | A | A | A | A |
| | Molding steam pressure: 0.22 MPa (G) | Fusion bondability | A | A | A | B | A |
| | | Surface appearance | A | A | A | C | B |
| | | Restorability | C | A | A | A | B |

*1 Parts by mass based on 100 parts by mass of TPO
*2 Parts by mass based on 100 parts by mass of TPO particles From the evaluation results of Examples 1 to 9, it was noted that by allowing the olefin-based thermoplastic elastomer expanded beads to have an apparent density of 40 to 300 g/L and an average surface layer membrane thickness (a) of 3 to 25 μm, in in-mold molding of the expanded beads, an expanded beads molded article which is excellent in fusion bondability, surface appearance (void), restorability, and tensile elongation can be produced.

On the other hand, in Comparative Examples 1 and 2, the average surface layer membrane thickness (a) of the expanded beads is 28 μm and 26 μm, respectively, and therefore, in in-mold molding of the expanded beads, the expanded beads molded article which is excellent in all of fusion bondability, surface appearance (void), restorability, and tensile elongation could not be produced at any molding pressure in a range of 0.16 to 0.22 MPa (G) in terms of a molding steam pressure.

The expanded beads of the present invention are excellent in in-mold moldability, and the expanded beads molded article obtained by using the expanded beads are excellent in tensile characteristics and can be suitably utilized for a seat cushioning material, a pad material for sporting, a shoe sole material, and the like.

The invention claimed is:

1. Expanded beads, which are olefin-based thermoplastic elastomer expanded beads containing a coloring agent and a cell controlling agent, and have an apparent density of 40 to 300 g/L, the expanded beads having a surface layer membrane having an average surface layer membrane thickness (a) of 5 to 20 μm, wherein the olefin-based thermoplastic elastomer constituting the expanded beads is a multi-block copolymer of a polyethylene block and an ethylene/α-olefin copolymer block, wherein the expanded beads are crosslinked expanded beads, provided that a proportion of a xylene insoluble fraction of the crosslinked expanded beads by a hot xylene extraction method is from 30 to 70% by mass, wherein the expanded beads have an average cell diameter (b) of 70 to 220 μm, provided that a ratio (b/a) of the average cell diameter (b) to the average surface layer membrane thickness (a) is from 8 to 12, wherein the multi-block copolymer has a flexural modulus of from 10 to 50 MPa, wherein the cell controlling agent in the expanded beads is from 0.01 to 1 parts by mass based on 100 parts by mass of the multi block copolymer, wherein an average cell membrane thickness of the expanded beads Tm is defined as (c), and a ratio (c/a) of the average cell membrane thickness Tm (c) to the average surface layer membrane thickness (a) is 0.36 or more and less than 1, and wherein the expanded beads are formed from resin particles comprising the multi-block copolymer, the coloring agent, and the cell controlling agent extruded in a strand form from an extruder and cut, the resin particles being expanded to form the expanded beads.

2. The expanded beads according to claim 1, wherein the coloring agent is an inorganic pigment and/or an organic pigment, and a blending amount of the coloring agent in the expanded beads is from 0.1 to 3.0 parts by mass based on 100 parts by mass of the olefin-based thermoplastic elastomer constituting the expanded beads.

3. The expanded beads according to claim 1, wherein the average cell membrane thickness Tm is defined as (c), the ratio (c/a) of (c) to the average surface layer membrane thickness (a) is 0.36 or more and less than 0.8.

4. The expanded beads according to claim 1, wherein the multi-block copolymer has a melt flow rate of 2 to 10 g/10 min at 190° C. and a load of 2.16 kg.

5. The expanded beads according to claim 1, wherein the multi-block copolymer is a multi-block copolymer containing a polyethylene block and an ethylene/1-octene copolymer block.

6. The expanded beads according to claim 1, wherein the cell controlling agent has a 50% volume average particle diameter (d50) of 0.01 to 50 μm as measured by a centrifugal sedimentation particle size measurement method.

7. An expanded beads molded article obtained by molding expanded beads to in-mold molding, the expanded beads molded article having a tensile elongation of 140% or more, wherein prior to in-mold molding, the expanded beads have the following characteristics:

the expanded beads being olefin-based thermoplastic elastomer expanded beads containing a coloring agent and a cell controlling agent, and having an apparent density of 40 to 300 g/L, the expanded beads having a surface layer membrane having an average surface layer membrane thickness (a) of 5 to 20 μm, wherein the olefin-based thermoplastic elastomer constituting the expanded beads is a multi-block copolymer of a polyethylene block and an ethylene/β-olefin copolymer block, wherein the expanded beads are crosslinked expanded beads, provided that a proportion of a xylene insoluble fraction of the crosslinked expanded beads by a hot xylene extraction method is from 30 to 70% by mass, wherein the expanded beads have an average cell diameter (b) of 70 to 220 μm, provided that a ratio (b/a) of the average cell diameter (b) to the average surface layer membrane thickness (a) is from 8 to 12, wherein the multi-block copolymer has a flexural modulus of from 10 to 50 MPa, wherein the cell controlling agent in the expanded beads is from 0.01 to 1 parts by mass based on 100 parts by mass of the multi block copolymer, wherein an average cell membrane thickness Tm is defined as (c), and a ratio (c/a) of the average cell membrane thickness Tm (c) to the average surface layer membrane thickness (a) is 0.36 or more and less than 1, and wherein the expanded beads are formed from resin particles comprising the multi-block copolymer, the coloring agent, and the cell controlling agent extruded in a strand form from an extruder and cut, the resin particles being expanded to form the expanded beads.

8. The expanded beads molded article according to claim 7, wherein the average cell membrane thickness Tm is defined as (c), and the ratio (c/a) of the average cell membrane thickness Tm (c) to the average surface layer membrane thickness (a) is 0.36 or more and less than 0.8.

9. The expanded beads molded article according to claim 7, wherein the coloring agent is an inorganic pigment and/or an organic pigment, and a blending amount of the coloring agent in the expanded beads is from 0.1 to 3.0 parts by mass based on 100 parts by mass of the olefin-based thermoplastic elastomer constituting the expanded beads.

* * * * *

UNITED STATES PATENT AND TRADEMARK OFFICE
CERTIFICATE OF CORRECTION

| | |
|---|---|
| PATENT NO. | : 11,466,137 B2 |
| APPLICATION NO. | : 16/348108 |
| DATED | : October 11, 2022 |
| INVENTOR(S) | : Shota Takagi and Masaharu Oikawa |

It is certified that error appears in the above-identified patent and that said Letters Patent is hereby corrected as shown below:

In the Claims

In Column 23, Claim 1, Lines 18-19, delete "of the expanded beads".

In Column 24, Claim 7, Line 12, delete "ethylene/β-olefin" and insert -- ethylene/α-olefin --, therefor.

Signed and Sealed this
Thirteenth Day of February, 2024

Katherine Kelly Vidal
*Director of the United States Patent and Trademark Office*